United States Patent [19]
Inoue

[11] Patent Number: 6,140,850
[45] Date of Patent: Oct. 31, 2000

[54] SERIAL BUS SPEED-UP CIRCUIT

[75] Inventor: Naoyuki Inoue, Kawasaki, Japan

[73] Assignee: Fujitsu Limited, Kawasaki, Japan

[21] Appl. No.: 09/166,587

[22] Filed: Oct. 6, 1998

[30]   Foreign Application Priority Data

Mar. 2, 1998   [JP]   Japan .................................. 10-049719

[51] Int. Cl.⁷ .................................................. H03K 5/13
[52] U.S. Cl. ............................................. 327/141; 327/145
[58] Field of Search ...................................... 327/141, 145, 327/165, 166; 326/30, 34; 375/362, 364, 368

[56]   References Cited

U.S. PATENT DOCUMENTS 5,557,648   9/1996   Ishihara ...................................... 375/376
  5,740,210   4/1998   Rokugawa ................................ 375/362

FOREIGN PATENT DOCUMENTS

63-81556   4/1988   Japan .

*Primary Examiner*—Tuan T. Lam
*Attorney, Agent, or Firm*—Armstrong, Westerman, Hattori McLeland & Naughton

[57]   ABSTRACT

A serial bus speed-up circuit includes a data pattern detecting unit for detecting whether or not the data output from one of the devices to the serial bus consecutively takes the same value, and a clock frequency varying unit for increasing a frequency of the clock output to the serial bus when the data pattern detecting unit detects that the data consecutively takes the same value. By utilizing the fact that the valid delay time and the transition time of the data can be omitted in a case where there is no change in the data value, it is possible to increase the clock frequency and accordingly, increase the data transfer rate.

7 Claims, 8 Drawing Sheets

SERIAL BUS SPEED-UP CIRCUIT

BACKGROUND OF THE INVENTION

The present invention generally relates to serial bus speed-up circuits, and more particularly to a serial bus speed-up circuit which increases a data transfer rate of a serial bus.

Conventionally, serial buses such as I²C, Access Bus and SM Bus make data transfers using a small number of signal lines, by transmitting a clock and a data using 2 signal lines. In such a serial bus, each drive employs an open-collector drive output system and a wired-OR connection system, so that a plurality of devices can be connected to the serial bus.

Figure 1A:
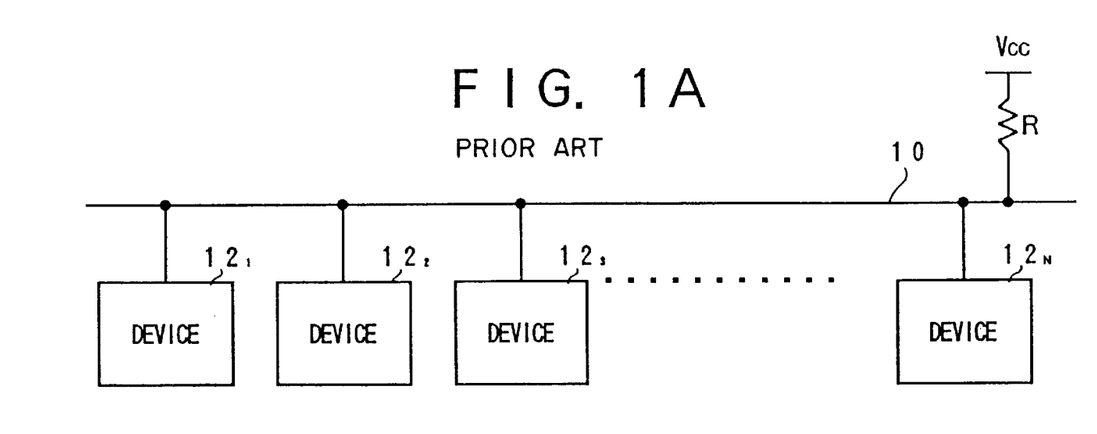
FIGS. 1A and 1B are block diagrams showing an example of a serial bus circuit.
Figure 1B:
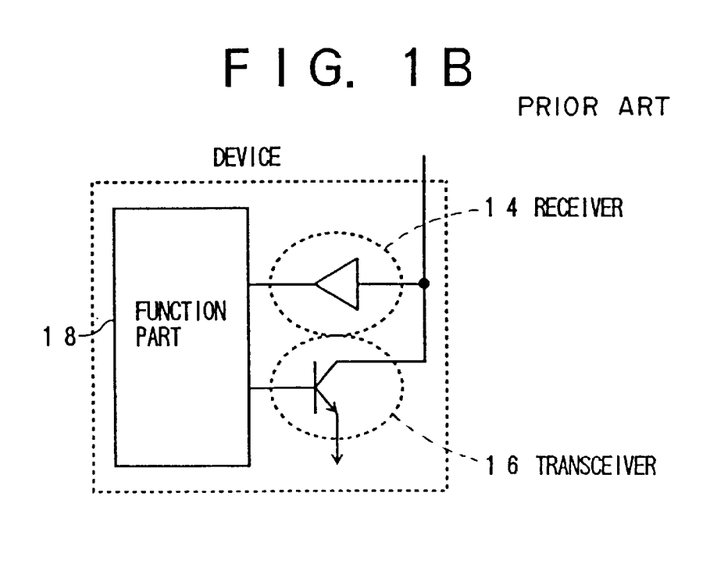

FIGS. 1A and 1B are block diagrams showing an example of a serial bus circuit. In FIG. 1A, devices $12_1$ through $12_N$ are connected to a signal line 10 of a serial bus. The signal line 10 is connected to a power supply Vcc via a pull-up resistor R, and the data or the clock is transferred using this signal line 10. In each of the devices $12_1$ through $12_N$, a transceiver 16 shown in FIG. 1B uses an open-collector transistor, and a collector of an output transistor is connected to the signal line 10 by a wired-OR connection. In addition, each of the devices $12_1$ through $12_N$ has a receiver 14 which is connected to the signal line 10. In each of the devices $12_1$ through $12_N$, the transceiver 16 and the receiver 14 are connected to a function part 18.

Figure 2:
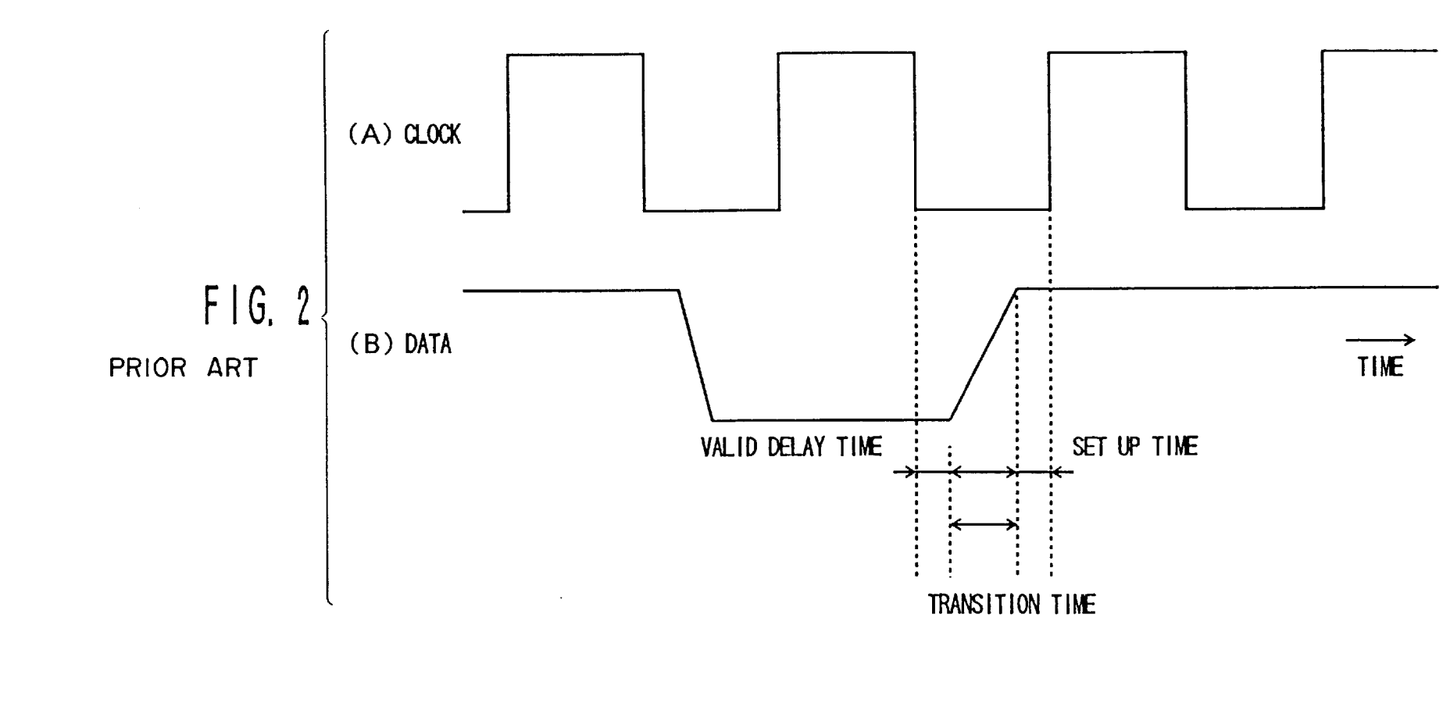
FIGS. 2(A) and 2(B) are timing charts showing a clock and a data on a serial bus.

One of the devices $12_1$ through $12_N$ in which a data transfer request is generated sets a clock signal line of the serial bus to a low level, and transmits to a data signal line of the serial bus a data shown in FIG. 2(B) in synchronism with a clock shown in FIG. 2(A). Another one of the devices $12_1$ through $12_N$ which receives the data inputs the data at a rising timing of the clock.

Conventionally, there is a bus system which varies a clock frequency in order to increase the data transfer rate of the bus. For example, a Japanese Laid-Open Patent Application No. 63-81556 proposes a bus system provided with a bus which is connected to a plurality of devices, a variable period clock generating means for supplying to each of the devices, as a common clock which restricts transmission and reception timings of the data transferred via the bus, a clock signal having a period which dynamically changes during operation of the bus, and a selecting means for selecting the period of the clock signal to be used for each data transfer operation depending on a data transfer operation condition.

In the serial bus described above, when the signal such as the data and the clock makes a transition from a low-level state to a high-level state, the signal rising time depends upon the resistance of the pull-up resistor R. In other words, if a total capacitance of a stray capacitance of the signal line 10 and input/output capacitances of the devices $12_1$ through $12_N$ connected to the signal line 10 is denoted by C and the resistance of the pull-up resistor R is denoted by R, a level V of the signal when the signal makes the transition from the low-level state to the high-level state can be described by the following formula, where t denotes the time.

$$V = Vcc(1 - \exp(-t/C \cdot R))$$

The input of the data is started with respect to the edge of the clock, and at the receiving end, it is necessary to guarantee a sufficient set up time of the data with respect to the edge of the clock. On the other hand, at the transmitting end, the data output is prescribed by a valid delay time from the edge of the clock. Hence, at least a sum of the valid delay time and the set up time becomes a minimum value of the clock period on the bus on the assumption that data flight time and transition time are equal to zero, and it is impossible to further increase the data transfer rate.

FIG. 2(B) shows the set up time, the valid delay time, and a transition time of the data, with respect to the clock shown in FIG. 2(A).

It is conceivable to reduce the resistance of the pull-up resistor R in order to increase the data transfer rate, but this would result in problems such as increased power consumption and increased sink current of the transceiver 16 of each device.

In the bus system proposed in the Japanese Laid-Open Patent Application No. 63-81556, the distances among each of the devices connected to the bus are known in advance, and a high-frequency clock is used when the distance between the devices transferring the data is short, and a low-frequency clock is used when the distance between the devices transferring the data is long. In other words, the clock frequency used for the data transfer between two devices is fixed in advance. For this reason, there is a problem in that it is difficult and troublesome to cope with a modification of the system such as an addition of a device connected to the bus and a change in a position where the device is connected to the bus. In addition, there is a problem in that it is impossible to increase the data transfer rate depending on a pattern of the data to be transferred.

SUMMARY OF THE INVENTION

Accordingly, it is a general object of the present invention to provide a novel and useful serial bus speed-up circuit in which the problems described above are eliminated.

Another and more specific object of the present invention to provide a serial bus speed-up circuit which can increase the data transfer rate in view of the above problems, by varying the clock or the resistance connected to the serial bus depending on the pattern of the data to be transferred using the serial bus.

Still another object of the present invention is to provide a serial bus speed-up circuit for increasing a data transfer rate of a serial bus which is coupled to a plurality of devices and transmits data serially in synchronism with a clock using two signal lines, comprising data pattern detecting means for detecting whether or not the data output from one of the devices to the serial bus consecutively takes the same value, and clock frequency varying means for increasing a frequency of the clock output to the serial bus when said data pattern detecting means detects that the data consecutively takes the same value. According to the serial bus speed-up circuit of the present invention, when it is detected that the data output to the serial bus from the device consecutively takes the same value, the frequency of the clock output to the serial bus is increased so as to increase the data transfer rate, by utilizing the fact that the valid delay time and the transition time of the data can be omitted when the data value does not change.

A further object of the present invention is to provide a serial bus speed-up circuit for increasing a data transfer rate of a serial bus which is coupled to a plurality of devices and transmits data serially in synchronism with a clock using two signal lines, comprising data transition detecting means for detecting whether or not the data output from one of the devices to the serial bus makes a transition, and element constant varying means for varying an element constant of a circuit element which sets the serial bus transmitting the data to a predetermined level when said data transition detecting means detects the transition of the data. According to the serial bus speed-up circuit of the present invention, by varying the element constant of the circuit element which sets the serial bus through which the data is transmitted to the predetermined level when it is detected that the data output to the serial bus makes a transition, it is possible to reduce the transition time of the data and to increase the data transfer rate.

Other objects and further features of the present invention will be apparent from the following detailed description when read in conjunction with the accompanying drawings.

DESCRIPTION OF THE PREFERRED EMBODIMENTS

Figure 3:
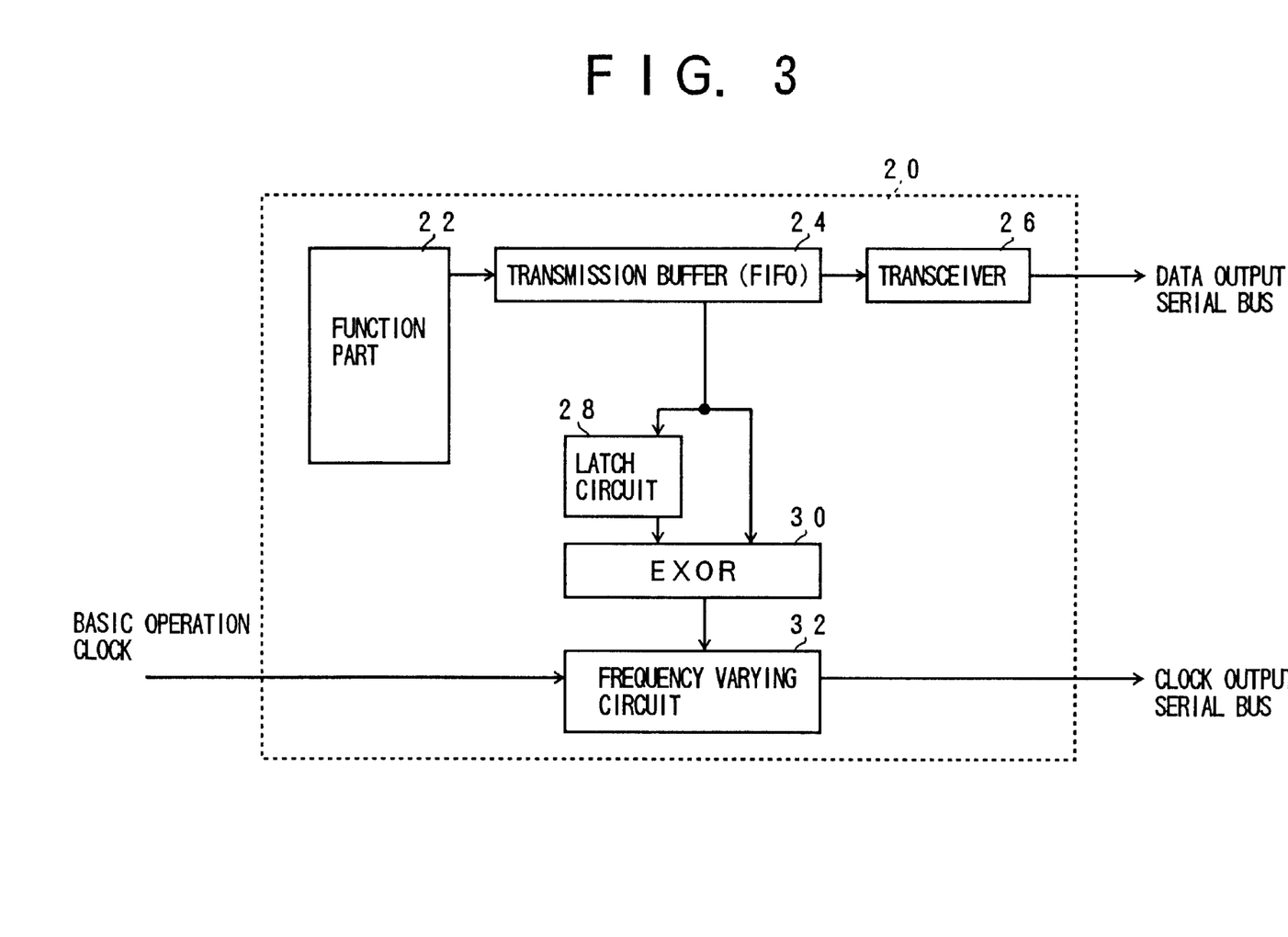
FIG. 3 is a circuit diagram showing a first embodiment of a serial bus speed-up circuit according to the present invention.

FIG. 3 is a circuit diagram showing a first embodiment of a serial bus speed-up circuit according to the present invention. In FIG. 3, a device 20 is connected to signal lines of a serial bus, and a data output from a function part 22 of this device 20 to the serial bus is supplied to a transmission buffer 24. The transmission buffer 24 is made up of a FIFO (First-In-First-Out). The data output from a final stage of the transmission buffer 24 is supplied to a transceiver 26. For example, the transceiver 26 is made up of an open-collector npn transistor having a base which receives the data from the transmission buffer 24, a collector connected to a data signal line of the serial bus for transferring the data, and an emitter which is grounded.

On the other hand, the data output from a stage prior to the final stage of the transmission buffer 24 is supplied to a latch circuit 28 and an exclusive-OR (EXOR) circuit 30. The latch circuit 28 is made up of a D-type flip-flop, for example, and delays the data by 1 bit before supplying the data to the exclusive-OR circuit 30. Hence, with respect to a data D-0 output from the stage prior to the final stage of the transmission buffer 24, the exclusive-OR circuit 30 generates a signal which takes a value 1 if a data D-1 of 1 bit before and a data D-2 of 2 bits before are the same and takes a value 0 if the data D-1 and D-2 are different. The output signal of the exclusive-OR circuit 30 is supplied to a frequency varying circuit 32. In this state, the transceiver 26 outputs the data D-1.

Figure 4:
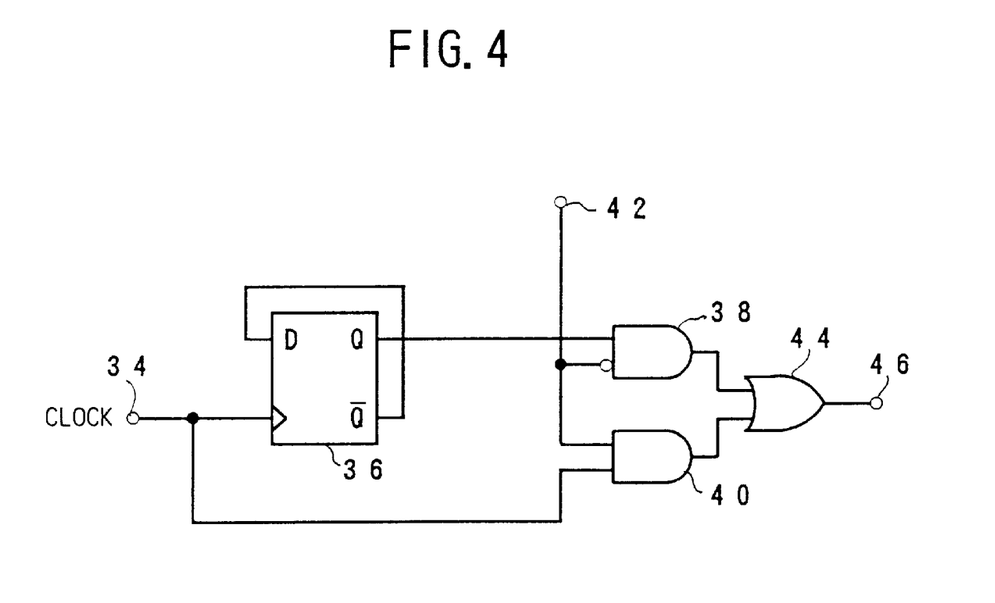
FIG. 4 is a block diagram showing a first embodiment of a frequency varying circuit of the serial bus speed-up circuit according to the present invention.

FIG. 4 is a block diagram showing a first embodiment of the frequency varying circuit 32. In FIG. 4, the frequency varying circuit 32 receives a clock from a terminal 34. This clock has a predetermined frequency equal to a higher data transfer rate output to bus. The clock is supplied to a clock input terminal of the D-type flip-flop 36 and an AND circuit 40. An inverted output of the D-type flip-flop 36 is fed back to a data terminal of the D-type flip-flop 36, thereby forming a ½ frequency-dividing circuit (T-type flip-flop). The clock is therefore frequency-divided by ½ and supplied to an AND circuit 38.

The output signal of the exclusive-OR circuit 30 is supplied to a terminal 42. The signal from the terminal 42 is supplied to the AND circuit 40, and is also inverted and supplied to the AND circuit 38. Output signals of the AND circuits 38 and 40 are supplied to an OR circuit 44, and an output signal of the OR circuit 44 is output from a terminal 46. Hence, when the output signal of the exclusive-OR circuit 30 has a value 0, the clock from the terminal 34 is frequency-divided by ½ in the D-type flip-flop 36 and output from the terminal 46. On the other hand, when the output signal of the exclusive-OR circuit 30 has a value 1, the clock from the terminal 34 is output as it is from the terminal 46. The 30 terminal 46 of the frequency varying circuit 32 is connected to a clock signal line of the serial bus. Accordingly, the above described clock is transmitted to the serial bus, and is supplied to the transmission buffer 24 and the latch circuit 28.

Figure 5:
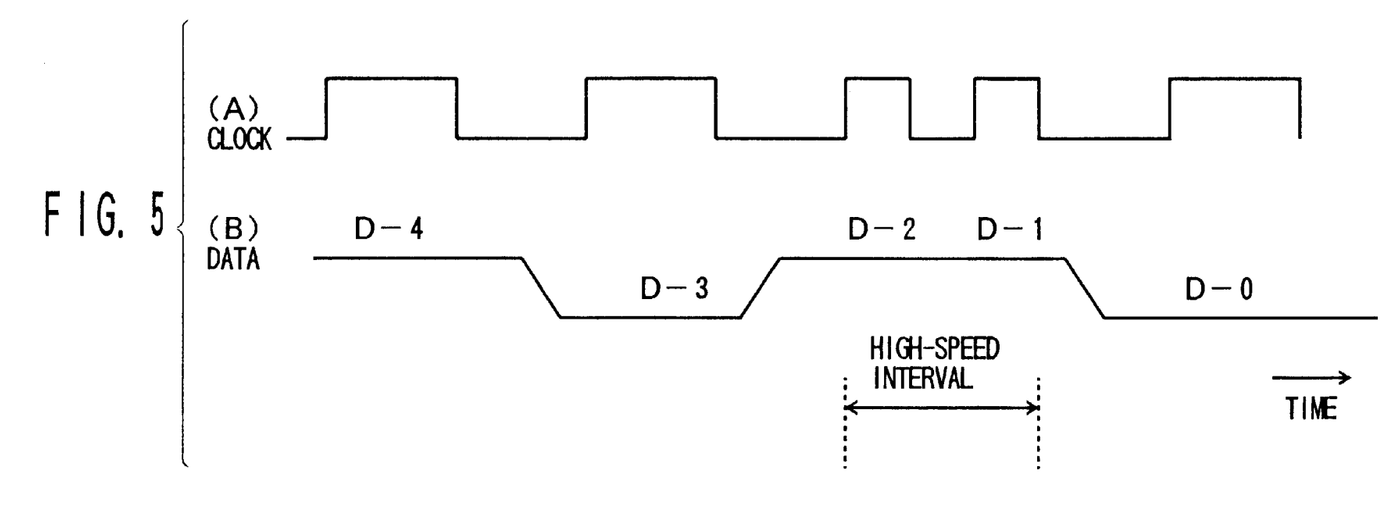
FIGS. 5(A) and 5(B) are timing charts showing a clock and a data output from the circuit of the present invention shown in FIG. 3.

FIGS. 5(A) and 5(B) are timing charts showing the clock and the data output from the circuit shown in FIG. 3. Because consecutive data D-1 and D-2 shown in FIG. 5(B) consecutively take the same value, the corresponding clock shown in FIG. 5(A) is not frequency-divided and has a high frequency. However, data D-0, D-3 and D-4 do not consecutively take the same value, and the corresponding clock is frequency-divided by ½ and has a low frequency.

Therefore, when it is detected that the data output from the device to the serial bus consecutively takes the same value, the fact that the valid delay time and the transition time of the data can be omitted in a case where the data value does not change is utilized, and the frequency of the clock output to the serial bus is increased so as to increase the data transfer rate.

Figure 6:
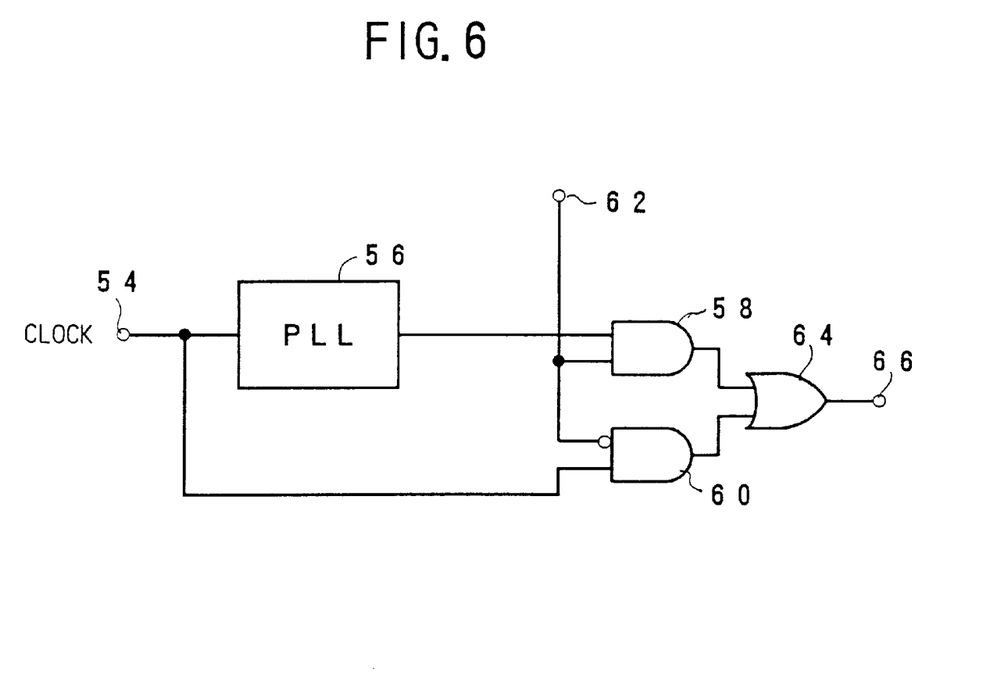
FIG. 6 is a block diagram showing a second embodiment of the frequency varying circuit of the serial bus speed-up circuit according to the present invention.

FIG. 6 is a block diagram showing a second embodiment of the frequency varying circuit 32. In FIG. 6, the frequency varying circuit 32 receives a clock from a terminal 54. This clock has a predetermined frequency equal to the lower data transfer rate output to bus. The clock is supplied to a PLL (phase locked loop) circuit 56 and an AND circuit 60. The PLL circuit 56 frequency-multiplies the clock having the 2-bit period from the terminal 54 by 2 and generates a clock having a frequency equal to a 1-bit period of the data output from the function part 22. The clock is therefore frequency-multiplied by 2 and supplied to an AND circuit 58.

The output signal of the exclusive-OR circuit 30 is supplied to a terminal 62. The signal from the terminal 42 is supplied to the AND circuit 58, and is also inverted and supplied to the AND circuit 60. Output signals of the AND circuits 58 and 60 are supplied to an OR circuit 64, and an output signal of the OR circuit 64 is output from a terminal 66. Hence, when the output signal of the exclusive-OR circuit 30 has a value 1, the clock from the terminal 34 is frequency-multiplied by 2 in the PLL circuit 56 and output from the terminal 66. On the other hand, when the output signal of the exclusive-OR circuit 30 has a value 0, the clock from the terminal 54 is output as it is from the terminal 66. The terminal 66 of the frequency varying circuit 32 is connected to a clock signal line of the serial bus, and the above described clock is transmitted to the serial bus.

Figure 7:
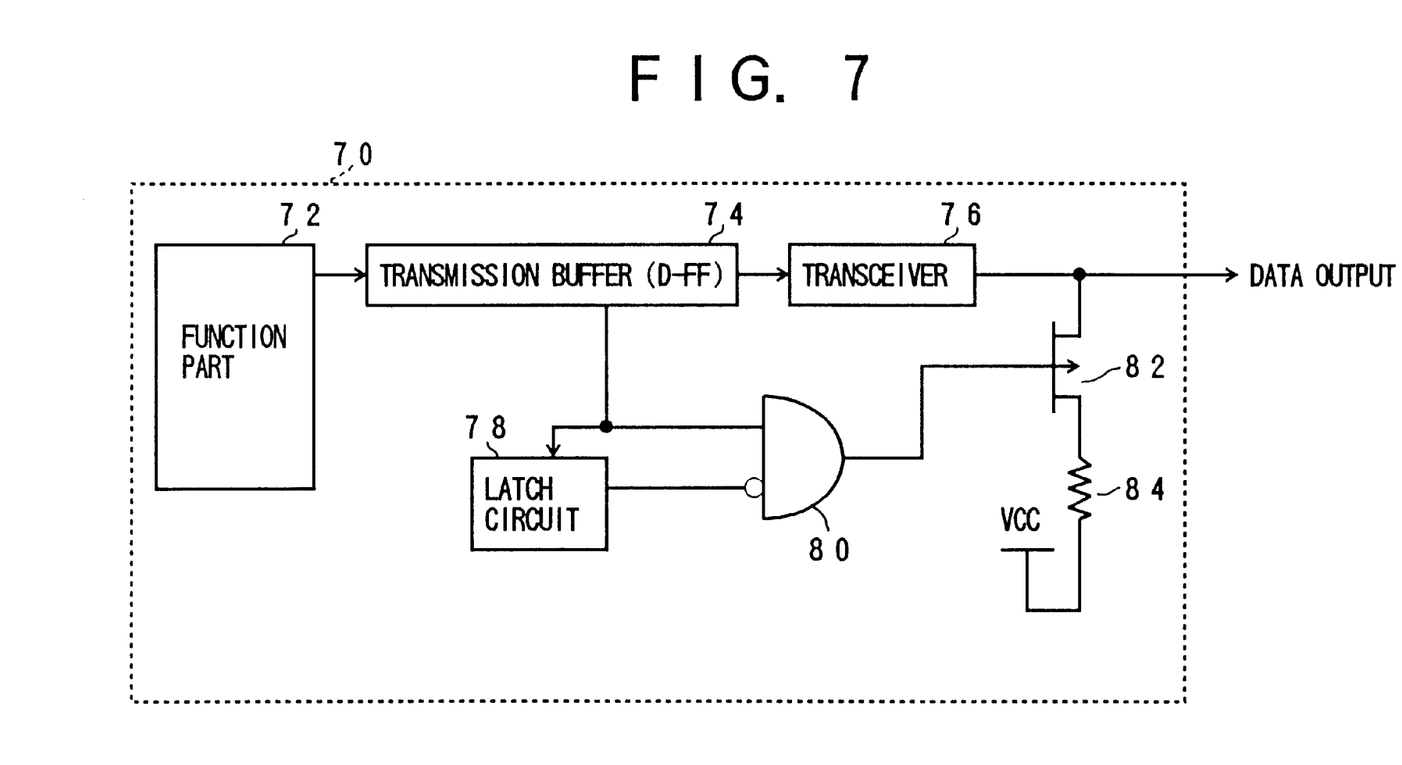
FIG. 7 is a circuit diagram showing a second embodiment of the serial bus speed-up circuit according to the present invention.

FIG. 7 is a circuit diagram showing a second embodiment of the serial bus speed-up circuit according to the present invention. In FIG. 7, a device 70 is connected to signal lines of a serial bus, and a data output from a function part 72 of this device 70 to the serial bus is supplied to a transmission buffer 74. For example, the transmission buffer 74 is made up of a D-type flip-flop, and delays the data by 1 bit. The data output from the transmission buffer 74 is supplied to a transceiver 76. For example, the transceiver 76 is made up of an open-collector npn transistor having a base which receives the data from the transmission buffer 74, a collector connected to a data signal line of the serial bus for transferring the data, and an emitter which is grounded.

On the other hand, the data to be output from the function part 72 to the serial bus is supplied to a latch circuit 78 and an AND circuit 80.

For example, the latch circuit 78 is made up of a D-type flip-flop, and delays the data by 1 bit. An output of this latch circuit 78 is supplied to an inverting input terminal of the AND circuit 80.

Hence, the AND circuit 80 outputs a high-level signal only when a data D-1 output from the transceiver 76 at a present point in time has a low level and a data D-0 output at a next point in time has a high level.

The output signal of the AND circuit 80 is supplied to a gate of an N-channel FET (field effect transistor) 82. A drain of the FET 82 is connected to a power supply Vcc via a pull-up resistor 84, and a source of the FET 82 is connected to the data signal line of the serial bus. For this reason, when the data D-1 output from the transceiver 76 at the present point in time has a low level and the data D-0 output at the next point in time has a high level, the FET 80 turns ON and connects the pull-up resistor 84 within the device 70 in parallel to a pull-up resistor which is connected to the data signal line of the serial bus outside the device 70, so as to reduce the resistance of the pull-up resistor. As a result, it is possible to reduce the data transition time, that is, the rising time of the data signal line of the serial bus, to thereby increase the data transfer rate.

Figure 8:
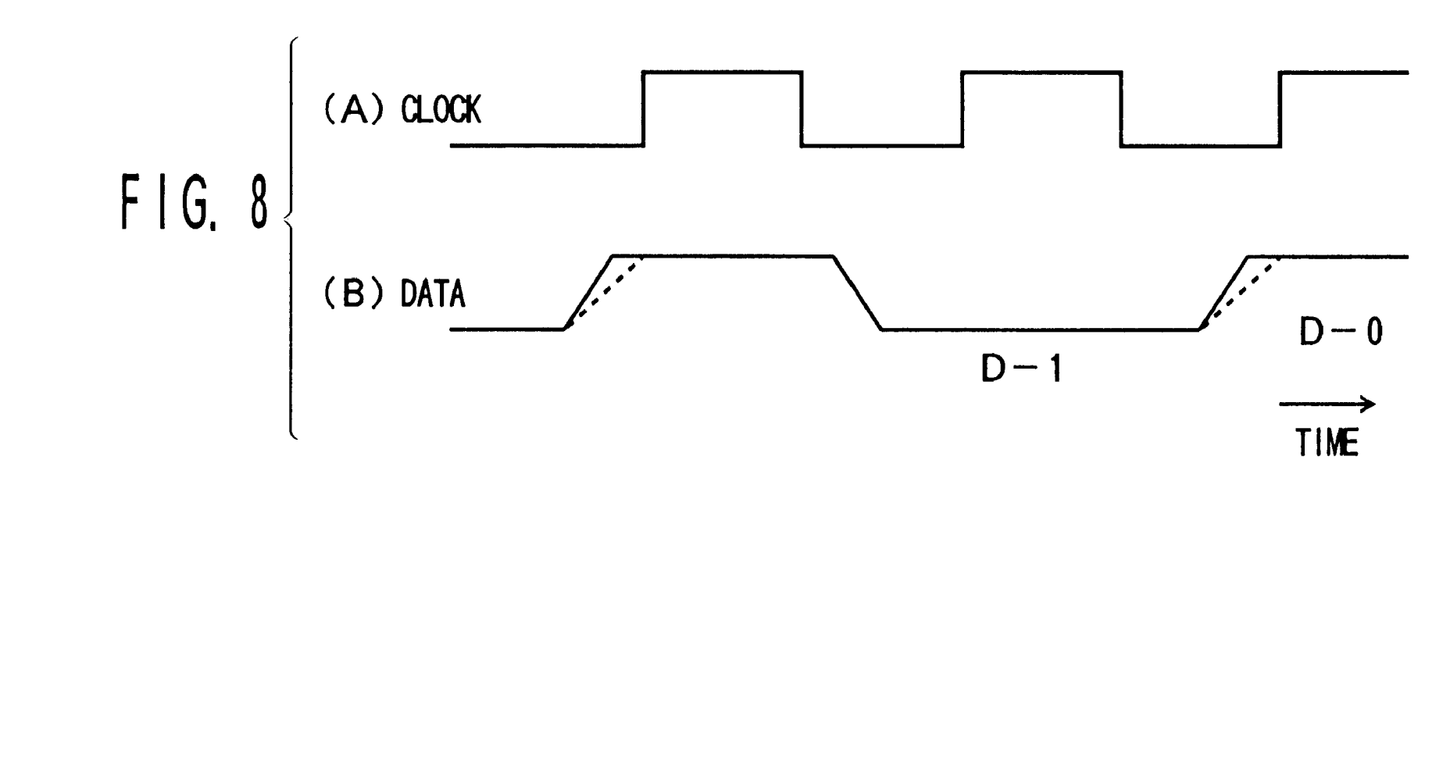
FIGS. 8(A) and 8(B) are timing charts showing a clock and a data output from the circuit of the present invention shown in FIG. 7.

FIGS. 8(A) and 8(B) are timing charts showing the clock and the data on the serial bus when the circuit shown in FIG. 7 is used. The data shown in FIG. 8(B) is input at the rise of the clock shown in FIG. 8(A). Since the data D-1 preceding the high-level data D-0 shown in FIG. 8(B) has a low level, the pull-up resistor 84 within the device 70 is connected in parallel to the pull-up resistor which is connected to the data signal line of the serial bus outside the device 70, and the rise of the data becomes sharp as indicated by a solid line in FIG. 8(B). In FIG. 8(B), a broken line indicates the signal waveform for a case where the pull-up resistor 84 within the device 70 is not connected to the data signal line of the serial bus.

Therefore, by reducing the resistance of the pull-up resistor of the serial bus when the data output to the serial bus makes a transition from the low level to the high level, it is possible to reduce the data transition time and to increase the data transfer rate.

The latch circuit 28 and the exclusive-OR circuit 30 correspond to the data pattern detecting means, and he frequency varying circuit 32 corresponds to the clock frequency varying means. The D-type flip-flop 36 corresponds to the frequency-dividing circuit. The AND circuits 38 and 40 and the OR circuit 44 correspond to the first selector, and the PLL circuit 56 corresponds to the frequency-multiplying circuit. The AND circuits 58 and 60 and the OR circuit 64 correspond to the second selector. In addition, the latch circuit 78 and the AND circuit 80 correspond to the data transition detecting means, and the FET 82 and the pull-up resistor 84 correspond to the element constant varying means.

Further, the present invention is not limited to these embodiments, but various variations and modifications may be made without departing from the scope of the present invention.

What is claimed is:

1. A serial bus speed-up circuit for increasing a data transfer rate of a serial bus which is coupled to a plurality of devices and transmits data serially in synchronism with a clock using two signal lines, comprising:

data pattern detecting means for detecting whether or not the data output from one of the devices to the serial bus consecutively takes the same value; and clock frequency varying means for increasing a frequency of the clock output to the serial bus when said data pattern detecting means detects that the data consecutively takes the same value.

2. The serial bus speed-up circuit as claimed in claim 1, wherein said clock frequency varying means frequency-divides the clock and outputs a frequency divided clock to the serial bus when said data pattern detecting means detects that the data does not consecutively take the same value.

3. The serial bus speed-up circuit as claimed in claim 2, wherein said clock frequency varying means comprises:

a frequency-dividing circuit frequency-dividing the clock; and a first selector selecting and outputting to the serial bus the frequency divided clock output from said frequency-dividing circuit when said data pattern detecting means detects that the data does not consecutively take the same value, and selecting and outputting to the serial bus the clock when said data pattern detecting means detects that the data consecutively takes the same value.

4. The serial bus speed-up circuit as claimed in claim 1, wherein said clock frequency varying means frequency-multiplies the clock and outputs a frequency multiplied clock to the serial bus when said data pattern detecting means detects that the data consecutively takes the same value.

5. The serial bus speed-up circuit as claimed in claim 4, wherein said clock frequency varying means comprises:

a frequency-multiplying circuit frequency-multiplying the clock; and a second selector selecting and outputting to the serial bus the frequency multiplied clock output from said frequency-multiplying circuit when said data pattern detecting means detects that the data consecutively takes the same value, and selecting and outputting to the serial bus the clock when said data pattern detecting means detects that the data does not consecutively take the same value.

6. A serial bus speed-tip circuit for increasing a data transfer rate of a serial bus which is coupled to a plurality of devices and transmits data serially in synchronism with a clock using two signal lines, comprising:

data transition detecting means for detecting whether or not the data output from one of the devices to the serial bus makes a transition; and element constant varying means, including a circuit element, for varying an element constant of the circuit element which sets the serial bus that is transmitting the data to a predetermined level when said data transition detecting means detects the transition of the data.

7. The serial bus speed-up circuit as claimed in claim 6, wherein said data transition detecting means detects a transition of the data output to the serial bus from a low level to a high level, and said element constant varying means decreases a resistance of a pull-up resistor of the serial bus.

* * * * *